(12) United States Patent
Irle et al.

(10) Patent No.: US 12,473,027 B2
(45) Date of Patent: Nov. 18, 2025

(54) ROTATIONAL ANGLE SENSOR ASSEMBLY AND STEERING SYSTEM FOR A VEHICLE

(71) Applicant: HELLA GmbH & Co. KGaA, Lippstadt (DE)

(72) Inventors: Henning Irle, Lippstadt (DE); Sebastian Forst, Kamen (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 154 days.

(21) Appl. No.: 18/236,187

(22) Filed: Aug. 21, 2023

(65) Prior Publication Data

US 2023/0391401 A1    Dec. 7, 2023

Related U.S. Application Data

(63) Continuation of application No. PCT/EP2021/078498, filed on Oct. 14, 2021.

(30) Foreign Application Priority Data

Feb. 22, 2021   (DE) .................... 10 2021 104 100.7

(51) Int. Cl.
   *B62D 15/02*          (2006.01)
(52) U.S. Cl.
   CPC ................ *B62D 15/0215* (2013.01)
(58) Field of Classification Search
   CPC .... B62D 15/0215; B62D 5/006; B62D 5/001; G01D 2205/22; G01D 2205/26
   See application file for complete search history.

(56) References Cited

U.S. PATENT DOCUMENTS 6,313,910 B1 * 11/2001 Garvey ................. G01J 1/4257
                                                     356/121
8,004,277 B2    8/2011 Patil et al.
                   (Continued)

FOREIGN PATENT DOCUMENTS

DE          10348914 A1    6/2005
DE      102008045195 A1    3/2010
                   (Continued)

OTHER PUBLICATIONS

International Search Report dated Feb. 23, 2022 in corresponding application PCT/EP2021/078498.

*Primary Examiner* — Joseph J Dallo
(74) *Attorney, Agent, or Firm* — Muncy, Geissler, Olds & Lowe, P.C.

(57) ABSTRACT

An angular position sensor assembly for determining an angular position of a shaft when the shaft rotates about an axis of rotation of the shaft. A rotational encoder is connected to the shaft in force transmission and a rotational sensor detects a movement of the rotational encoder. On the shaft, a non-rotatable first gear part of a gearbox of the angular position sensor assembly is arranged and the rotational encoder is formed as a second gear part of the gearbox engaged with the first gear part. The gearbox simultaneously forms a fixed mechanical stop of the shaft on a first end of an angular position range of the shaft when the shaft rotates counterclockwise and on a second end of the angular position range of the shaft when the shaft rotates clockwise.

8 Claims, 1 Drawing Sheet

(56) References Cited

U.S. PATENT DOCUMENTS

| | | | |
|---|---|---|---|
| 2013/0340560 A1* | 12/2013 | Burridge | B25J 17/025 74/490.05 |
| 2015/0362305 A1* | 12/2015 | Ferrari | G01D 5/34 33/503 |
| 2016/0158904 A1* | 6/2016 | Albert | F16M 13/02 248/550 |
| 2017/0023442 A1* | 1/2017 | Braghiroli | G01M 17/021 |
| 2020/0070871 A1 | 3/2020 | Du et al. | |
| 2022/0091152 A1* | 3/2022 | Naslund | B64D 43/02 |
| 2023/0391401 A1* | 12/2023 | Irle | B62D 5/001 |

FOREIGN PATENT DOCUMENTS

| | | | | |
|---|---|---|---|---|
| DE | 102010030801 A1 | 1/2012 | | |
| DE | 102014212498 A1 | 12/2015 | | |
| DE | 102015202733 A1 | 8/2016 | | |
| JP | H11211456 A | 8/1999 | | |
| KR | 100802664 B1 | 2/2008 | | |
| WO | WO-2011029654 A2 * | 3/2011 | | F02D 41/009 |

* cited by examiner

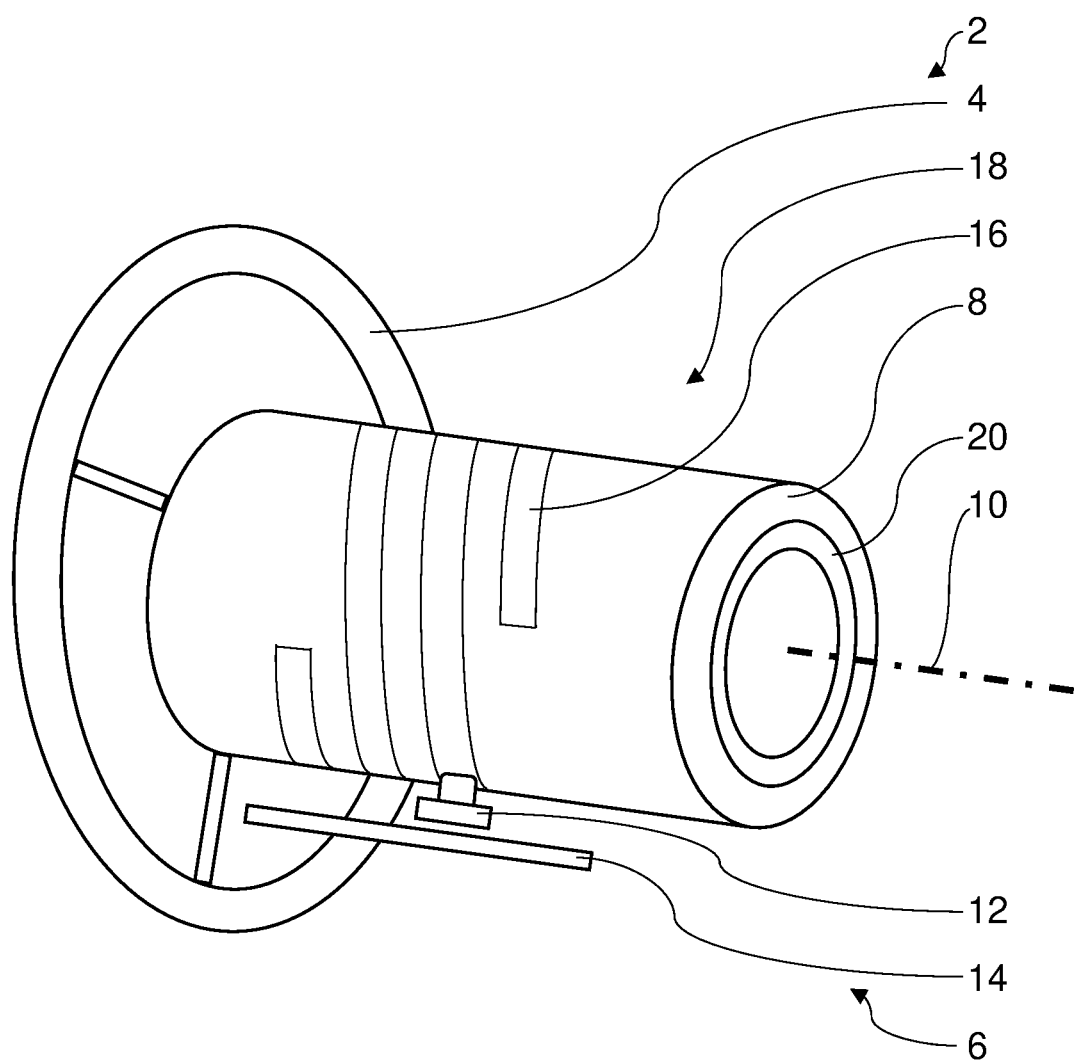

ROTATIONAL ANGLE SENSOR ASSEMBLY AND STEERING SYSTEM FOR A VEHICLE

This nonprovisional application is a continuation of International Application No. PCT/EP2021/078498, which was filed on Oct. 14, 2021, and which claims priority to German Patent Application No. 10 2021 104 100.7, which was filed in Germany on Feb. 22, 2021, and which are both herein incorporated by reference.

BACKGROUND OF THE INVENTION

Field of the Invention

The present invention relates to an angular position sensor assembly and a steering system for a vehicle.

Description of the Background Art

Angular position sensor assemblies and steering systems for vehicles are known in the conventional art in numerous design variants. The known angular position sensor assemblies for determining an angular position of a shaft when the shaft rotates about an axis of rotation of the shaft include, among other things, a rotational encoder in force transmission \with the shaft and a rotational sensor for detecting movement of the rotational encoder. The known steering systems for vehicles include a rigid steering column, a control system, a steering wheel rotatably arranged on the steering column by means of a steering wheel actuator and a shaft, wherein the steering wheel actuator connected to the control system in a signal-transmitting manner and having an external rotor electric motor is rigidly attached to the steering column and connected to the steering wheel by means of the shaft in a torque-transmitting manner, and the above-mentioned angular position sensor assembly connected to the control system in a signal-transmitting manner for determining an angular position of the above-mentioned shaft rotatably fixed to the steering wheel and connected to the steering wheel actuator in a torque-transmitting manner when the shaft rotates about an axis of rotation of the shaft.

This is where the present invention comes in.

SUMMARY OF THE INVENTION

It is therefore an object of the present invention to improve an angular position sensor assembly and a steering system for a vehicle equipped therewith.

This object is achieved by an angular position sensor assembly, which is characterized in that a first gear part of a gearbox of the angular position sensor assembly is arranged in a non-rotatable manner on the shaft and the rotational encoder is designed as a second gear part of the gearbox engaged with the first gear part, wherein the gearbox simultaneously forms a fixed mechanical stop of the shaft in each case on a first end of an angular position range of the shaft when the shaft rotates in a counterclockwise direction and on a second end of the angular position range of the shaft when the shaft rotates clockwise. Further, this object is achieved by a steering system according to the invention.

A major advantage of the invention lies in particular in the fact that an angular position sensor assembly and a steering system equipped therewith are improved for a vehicle. Due to the design of the angular position sensor assembly and the steering system for a vehicle according to the invention, the structure of the angular position sensor assembly on the one hand and the steering system for a vehicle on the other hand is considerably simplified. This is particularly the case because, in the angular position sensor assembly according to the invention, the gearbox serves, on the one hand, as a fixed mechanical stop of the shaft when the shaft rotates counterclockwise and clockwise about its axis of rotation, thus effectively and safely preventing over-rotation of the shaft, for example over-steering of the steering wheel of the steering system. On the other hand, the gearbox is also used to detect a partial and/or a whole and/or repeated rotation of the shaft and thus, for example, of the steering wheel of the steering system. This enables a space-saving and component-saving as well as construction and production-friendly design of the angular position sensor assembly and the steering system equipped therewith for a vehicle.

In principle, the angular position sensor assembly according to the invention can be freely selected according to type, function, material and dimensioning within wide suitable limits.

An advantageous further development of the angular position sensor assembly according to the invention provides that the angular position sensor assembly is designed for the determination of a plurality of 360° revolutions of a shaft, wherein the shaft is rotatable in an angular position range from $-n*360°$ to $+n*360°$ about the axis of rotation of the shaft and the gearbox simultaneously forms one of the fixed mechanical stops of the shaft at an angular position of $-n*360°$ and at an angular position of $+n*360°$. In this way, the scope of application of the angular position sensor assembly according to the invention is significantly expanded. For example, this is advantageous in the case of commercial vehicles such as trucks or the like, which usually require multiple turns of the steering wheel when steering the vehicle. In respect of n, this can be a natural number. However, this is not mandatory. Accordingly, it would also be possible to imagine angular position ranges in which the angular position range ends with an incomplete rotation when the shaft rotates counterclockwise and clockwise, starting from 0°.

The first gear part can be designed as an integral part of the shaft, preferably that the first gear part is designed as a threaded groove in the shaft and the second gear part as a slot nut guided in the threaded groove. As a result, the gearbox can be implemented in a particularly simple and robust way in terms of design and production technology. This applies in particular to the preferred embodiment of this development.

The angular position sensor assembly can have an angular position encoder non-rotatably connected to the shaft and an angular position sensor corresponding to the angular position encoder for sensing rotations of the shaft about the axis of rotation in an angular position range of less than $-/+360°$, preferably that the angular position encoder is arranged on a free end face of the shaft, particularly preferably that the angular position encoder is designed as an integral part of the shaft. In this way, for example, a so-called coarse-fine track method is possible by means of the rotational encoder and the rotational sensor on the one hand and by means of the angular position encoder and the angular position sensor on the other hand. In particular, however, the application of the so-called vernier method is also conceivable.

The angular position encoder and the angular position sensor can also be suitably designed to detect rotations of the shaft about the axis of rotation in an angular position range of greater than $-/+360°$, preferably $-/+N*360°$. As a result, it is sufficient, for example, if the angular position range of the steering wheel in a vehicle is reduced to less than two revolutions, for example, to detect only two switching states by means of the rotational encoder and the rotational sensor.

Accordingly, in this or similar cases, it is not necessary for the rotational encoder and the rotational sensor to detect the angular position with a high resolution. Instead, the rotational encoder and the rotational sensor can only be designed to function as a counter with a limited and manageable number of switching positions. For example, the rotational sensor can be capacitive, inductive or optical (e.g., as a light barrier). Such systems are also referred to as proximity switches.

For example, in the case of a steering system that has an angular position range of −350° to +350°, such a counter can be designed in such a way that a metal surface (darkening or reflection surface for optical sensors) acts under/in front of the proximity switch for a nominal range of −350° to 0° and nominally in the range from 0° to +350°, such an effect is not given. In other words, a type of switch is implemented that switches at 0°, which is supposed to correspond to the straight-line stability of the vehicle. A turning of the steering wheel to the left or right, i.e., a rotation of the shaft in a counterclockwise or clockwise direction, can be clearly distinguished by means of the switching state.

Depending on the choice of switch and the basic physical principle used (capacitive, inductive, optical), a gain in safety can be achieved by using a diverse basic physical principle. This means that, as a rule, different basic physical principles cannot be influenced by one and the same error or by one and the same malfunction at the same time.

Another aspect when choosing a diverse design can be the minimization of crosstalk, if installation space integration in a confined space is desired or necessary.

These considerations for the choice of diverse basic principles apply in the same way to rotational encoders and rotational sensors and/or angular position encoders and angular position sensors, each with higher resolutions than is the case if they are designed as switches or the like.

The functionality remains the same, regardless of whether the rotational encoder and the rotational sensor are designed high-resolution or as a switch, possibly as a multi-stage switch, in combination with the angular position encoder and the angular position sensor, whereupon the choice must be made in each individual case on the basis of commercial and space-integrative considerations as well as on the basis of functional safety considerations.

The rotational sensor and/or the angular position sensor can each be designed as inductive sensors, preferably that the rotational sensor and/or the angular position sensor each have a measuring frequency greater than 1 MHz. Inductive sensors are robust and very reliable even under difficult operating conditions, such as in vehicles. This applies in particular to the preferred embodiment of this further development. Due to the preferred embodiment, parasitic crosstalk of the motor currents or by permanent magnets is effectively prevented. Without further shielding measures of the rotational sensor and/or the angular position sensor, it is thus possible to comply with the electromagnetic compatibility (EMC) tests known in the automotive environment with regard to immunity and radiation.

In principle, the steering system according to the invention for a vehicle can also be freely selected according to type, function, material and dimensioning within wide suitable limits. In particular, the steering system according to the invention can be used with advantage in so-called steer-by-wire vehicles.

The angular position encoder and the angular position sensor can also be designed to detect the rotational position of the external rotor of the electric motor relative to the rigid steering column, preferably that the sensing of the rotational position is designed and configured in a manner matched to a pole pair pitch of the electric motor. In this way, the functionality of the angular position encoder and the angular position sensor is increased. This is particularly advantageous in the preferred embodiment of this further development. It is necessary, for example, to detect the rotational position of the external rotor of the electric motor relative to the rigid steering column if asymmetries in the motor or in the sensors have to be compensated for over an angular position range of more than −/+360°. Such compensation is conveniently carried out in the scheme by means of a look-up table. For example, angles between the data points of the aforementioned table are calculated mathematically by interpolation.

Compensation over the full −/+360° is important in that many of the mechanical tolerance effects and asymmetries can only be detected and thus compensated for over the full −/+360°. Of course, asymmetries with a period above −/+180° or smaller divisions of −/+360° can also develop, which in such cases must be corrected according to the same scheme.

The angular position sensor can be arranged on a printed circuit board attached to the steering column and the shaft with the angular position encoder protrudes through an opening in the printed circuit board. This makes it possible, for example, to arrange the angular position sensor relative to the external rotor electric motor in a very space-saving manner, since a ring- or segment-shaped sensor can be accommodated very well in terms of installation space in the case of external rotor electric motors. For example, such angular position sensors are designed as a ring or as a segment of a ring.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE shows an exemplary steering system according to the invention for a vehicle having the angular position sensor assembly according to the invention in a partial perspective view.

DETAILED DESCRIPTION

The FIGURE shows an example of the steering system according to the invention for a vehicle having the angular position sensor assembly according to the invention purely by way of example.

The steering system 2 is designed as a so-called steer-by-wire system and comprises a rigid steering column, a control system, a steering wheel 4 rotatably arranged on the steering column by means of a steering wheel actuator and a shaft 8, wherein the steering wheel actuator connected to the control system in a signal-transmitting manner and having an external rotor electric motor is rigidly attached to the steering column and connected to the steering wheel 4 by means of the shaft 8 in a torque-transmitting manner. Furthermore, the steering system 2 comprises an angular position sensor assembly 6 connected to the control system in a signal-transmitting manner for determining an angular position of the shaft 8 non-rotatably connected to the steering wheel 4 and connected to the steering wheel actuator in a torque-transmitting manner when the shaft 8 rotates about a rotation axis 10 of the shaft 8. The steering column, the control system and the steering wheel actuator with the external rotor electric motor are not shown in the FIGURE. The control system is arranged in a manner well-known to the skilled person on a printed circuit board of the steering system 2.

The angular position sensor assembly 6 for determining the angular position of the shaft 8 when the shaft 8 rotates about the axis of rotation 10 of the shaft 8 comprises a rotational encoder 12 connected to the shaft 8 in force transmission and a rotational sensor 14 for detecting movement of the rotational encoder 12, wherein according to the invention a non-rotatable first gear part 16 of a gearbox 18 of the angular position sensor assembly 6 is arranged on the shaft 8 and the rotational encoder 12 is formed as a second part of the gearbox 18 engaged with the first part of the gearbox 16, and wherein the gearbox 18 simultaneously forms in each case a fixed mechanical stop of the shaft 8 on a first end of an angular position range of the shaft 8 when the shaft 8 rotates counterclockwise and on a second end of the angular position range of the shaft 8 when the shaft 8 rotates clockwise.

In the present embodiment, the angular position sensor assembly 6 is designed for the determination of a plurality of 360° revolutions of the shaft 8, wherein the shaft 8 can be rotated about the axis of rotation 10 of the shaft 8 in an angular position range from $-n*360°$ to $+n*360°$ and the gearbox 18 simultaneously forms one of the fixed mechanical stops of the shaft 8 at an angular position of $-n*360°$ and at an angular position of $+n*360°$. The signs "−" and "+" in the application text only stand for a possible rotation of the shaft 8 in a counterclockwise direction and clockwise about its axis of rotation 10.

The first gear part 16 is designed here as an integral part of the shaft 8, namely in such a way that the first gear part 16 is designed as a threaded groove in the shaft 8 and the second gear part 12 as a slot nut guided in the threaded groove 16.

In the present example, the angular position sensor assembly 6 also has an angular position encoder 20 non-rotatably connected to the shaft 8 and an angular position sensor corresponding to the angular position encoder 20 for detecting rotations of the shaft 8 about the axis of rotation 10 in an angular position range of less than $-/+360°$, wherein the angular position encoder 20 is arranged here on a free end face of the shaft 8, namely in such a way that the angular position encoder 20 is designed as an integral part of the shaft 8. The angular position sensor is not shown here and has traces arranged on the printed circuit board of the steering system 2, which is also not shown.

The angular position encoder and the angular position sensor may also be suitably designed to detect rotations of the shaft about the axis of rotation in an angular position range greater than $-/+360°$, preferentially, of $-/+n*360°$. See also the relevant explanations in the introduction to the description.

The rotational sensor 14 and the angular position sensor can each be designed as inductive sensors, wherein the rotational sensor 14 and the angular position sensor each have a measuring frequency greater than 1 MHz. In principle, however, other sensor principles, such as capacitive or optical sensor technology, are also conceivable. See also the corresponding explanations in the introduction to the description.

In the present embodiment, it is also provided that the angular position encoder 20 and the angular position sensor are also designed to detect the rotational position of the external rotor of the electric motor relative to the rigid steering column, namely in such a way that the detection of the rotational position is designed and configured in a manner matched to a pole pair pitch of the electric motor. More detailed information can also be found in the description introduction.

In the following, the operation of the steering system according to the invention for a vehicle with the angular position sensor assembly according to the invention according to the present embodiment is briefly explained.

As soon as a driver of the vehicle, who is not shown, turns the steering wheel 4 of the steering system 2, the shaft 8 is also rotated about its axis of rotation 10. Since the rotational encoder 12, which is designed as a link block, is engaged with the first gear part 16 of the gearbox 18, which is designed as a thread, the rotational encoder 12 is moved by means of the rotation of the shaft 8 about its axis of rotation 10 in the image plane of FIG. 1, depending on the direction of rotation, from left to right or from right to left. In the present embodiment, the rotational motion of the shaft 8 is thus converted into a translational motion of the rotational encoder 12. Since this changes the relative position of the rotational encoder 12 to the rotational sensor 14, the change in the angular position can be detected by means of the rotational sensor 14 and be forwarded to the control system for further processing.

With the aforementioned rotation of the shaft 8 about its axis of rotation 10, the angular position encoder 20 shaft 8 integrated into the end face shown in FIG. 1 is rotated about the axis of rotation 10. Accordingly, its relative position to the angular position sensor also changes, so that the change in the angular position can also be detected by means of the angular position sensor and forwarded to the control system for further processing.

For example, output signals generated in this manner by the rotational sensor 12 and the angular position sensor can be converted in the control system into an angular position of the shaft 8 and thus of the steering wheel 4 of the steering system 2 by one of the methods mentioned in the description introduction.

Due to the design of the angular position sensor assembly 6 and the steering system 2 according to the invention, the structure of the angular position sensor assembly 6 on the one hand and the steering system 2 on the other hand is significantly simplified. This is particularly the case because the gearbox 18 in the angular position sensor assembly 6 serves, on the one hand, as a fixed mechanical stop of the shaft 8 when the shaft 8 rotates counterclockwise and clockwise about its axis of rotation 10, thus effectively and safely preventing over-rotation of the shaft 8, namely over-steering of the steering wheel 4 of the steering system 2. On the other hand, the gearbox 18 is simultaneously used to detect a partial and/or a whole and/or repeated rotation of the shaft 8 and thus, for example, of the steering wheel 4 of the steering system 2. This enables a space-saving and component-saving as well as design- and production-friendly design of the angular position sensor assembly 6 and the steering system 2 equipped therewith.

The invention is not limited to the present embodiment. For example, the steering system according to the invention and the angular position sensor assembly according to the invention can also be advantageously used in other types of vehicles.

In particular, the invention is not limited to the aforementioned design and manufacturing details.

For example, instead of the thread-like first threaded part, the rotational encoder designed as a second threaded part, for example the slot nut from the embodiment, can be guided on the shaft by means of the first threaded part in such a way that the rotational encoder does not move translationally but rotationally when the shaft rotates about its axis of rotation, in relation to the axis of rotation.

In contrast to the angular position encoder 20 being designed as a so-called end-of-shaft encoder in the present embodiment, the angular position encoder may be designed as a so-called through bore encoder in other embodiments of the invention. Accordingly, the angular position sensor could be arranged on a printed circuit board attached to the steering column, in which case the shaft protrudes through an opening in the circuit board with the angular position encoder.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A steering system for a vehicle, the steering system comprising:
   a rigid steering column;
   a control system;
   a steering wheel rotatable on the steering column via a steering wheel actuator;
   a shaft, the steering wheel actuator being connected to the control system in a signal-transmitting manner and has an external rotor electric motor that is rigidly attached to the steering column and connected to the steering wheel via the shaft in a torque-transmitting manner; and
   an angular position sensor assembly connected to the control system in a signal-transmitting manner for determining an angular position of the shaft rotatably fixed to the steering wheel and connected in a torque-transmitting manner to the steering wheel actuator when the shaft rotates about an axis of rotation of the shaft,
   wherein the angular position sensor assembly comprises a rotational encoder connected to the shaft in a force transmission manner; a rotational sensor to detect movement of the rotational encoder; a non-rotatable first gear part of a gearbox of the angular position sensor assembly that is arranged on the shaft; and an angular position encoder which is non-rotatably fixed to the shaft and an angular position sensor corresponding to the angular position encoder for detecting rotations of the shaft about the axis of rotation in an angular position range of less than −/+360°,
   wherein the rotational encoder is designed as a second gear part of the gearbox that is engaged with the first gear part,
   wherein the gearbox simultaneously forms a fixed mechanical stop of the shaft on a first end of an angular position range of the shaft when the shaft rotates counterclockwise and on a second end of the angular position range of the shaft when the shaft rotates clockwise, and
   wherein the angular position encoder and the angular position sensor additionally sense the rotary position of the external rotor of the electric motor relative to the rigid steering column.

2. The steering system according to claim 1, wherein the angular position sensor assembly is formed for the determination of a plurality of 360° revolutions of the shaft, wherein the shaft is rotatable in an angular position range from −n*360° to +n*360° about the axis of rotation of the shaft and the gearbox simultaneously forms the fixed mechanical stop of the shaft at an angular position of −n*360° and at an angular position of +n*360°.

3. The steering system according to claim 1, wherein the first gear part is designed as an integral part of the shaft or wherein the first gear part is a threaded groove in the shaft and the second gear part is a slot nut guided in the threaded groove.

4. The steering system according to claim 1, wherein the angular position encoder is formed as an integral part of the shaft.

5. The steering system according to claim 4, wherein the angular position encoder and the angular position sensor are also designed to detect rotations of the shaft about the axis of rotation in an angular position range greater than −/+360°.

6. The steering system according to claim 1, wherein the rotational sensor and/or the angular position sensor are each designed as inductive sensors having a measuring frequency greater than 1 MHz.

7. The steering system according to claim 1, wherein the sensing of the rotary position is designed and configured in a manner matched to a pole pair pitch of the electric motor.

8. The steering system according to claim 1 wherein the angular position sensor is arranged on a printed circuit board attached to the steering column and the shaft with the angular position encoder protrudes through an opening in the printed circuit board.

* * * * *